United States Patent
Luo et al.

(10) Patent No.: US 10,496,224 B2
(45) Date of Patent: Dec. 3, 2019

(54) TOUCH SENSING CIRCUIT, TOUCH PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Hao Luo, Beijing (CN); Quanguo Zhou, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

(*) Notice: Subject to any disclaimer, the term of this patent is extended or adjusted under 35 U.S.C. 154(b) by 427 days.

(21) Appl. No.: 15/214,363

(22) Filed: Jul. 19, 2016

(65) Prior Publication Data

US 2017/0269764 A1  Sep. 21, 2017

(30) Foreign Application Priority Data

Mar. 17, 2016  (CN) .......................... 2016 1 0154493

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01)

(58) Field of Classification Search
CPC ...................................................... G09G 3/3659
See application file for complete search history.

(56) References Cited

U.S. PATENT DOCUMENTS

| 2015/0379926 | A1* | 12/2015 | Wu | G09G 3/3225 345/215 |
| 2016/0041676 | A1* | 2/2016 | Tan | G06F 3/0416 345/173 |
| 2017/0269747 | A1* | 9/2017 | Hu | G06F 3/0412 |
| 2017/0269783 | A1* | 9/2017 | Yang | G06F 3/0418 |

* cited by examiner

*Primary Examiner* — William Boddie
*Assistant Examiner* — Jeffrey Parker
(74) *Attorney, Agent, or Firm* — Womble Bond Dickinson (US) LLP

(57) ABSTRACT

Disclosed is a touch sensing circuit which includes: a compensating module configured to provide a compensating voltage at a first node in response to control signals from a plurality of control signal lines; a read control module configured to transfer a voltage sensed by a touch sensing electrode to the first node in response to a read control signal from a read control signal line, so that the first node has a voltage which is a sum of the compensating voltage and the sensed voltage; and a driving module configured to provide an output signal associated with the sensed voltage to an output signal line in response to the voltage of the first node. Also disclosed are a touch panel and a display device.

19 Claims, 5 Drawing Sheets

TOUCH SENSING CIRCUIT, TOUCH PANEL AND DISPLAY DEVICE

CROSS-REFERENCE TO THE RELATED APPLICATIONS

The present application claims the benefit of Chinese Patent Application No. 201610154493.3, filed on Mar. 17, 2016, the entire disclosure of which is incorporated herein by reference.

TECHNICAL FIELD

The present disclosure relates to the field of display technology, and particularly to a touch sensing circuit, a touch panel and a display device.

BACKGROUND

A touch panel usually includes a touch sensing electrode and a touch sensing circuit. The touch sensing electrode is used to sense a touch event and provide a sensed voltage. The touch sensing circuit (also called the reading circuit) is used to read the sensed voltage by converting the sensed voltage into an electrical signal which can be easily processed by a subsequent processing circuit.

Due to factors such as manufacturing processes, temperatures and aging of elements, characteristic parameters of elements (e.g., the threshold voltage of a transistor) in the touch sensing circuit are apt to drift, thereby causing errors in the reading of the voltage by the sensing circuit. This may cause an erroneous sensing of the touch event.

SUMMARY

Embodiments of the present disclosure provide a touch sensing circuit, a touch panel and a display device, which may alleviate or eliminate the errors of the touch sensing circuit in reading the voltage that are caused by the drift of the characteristic parameters of elements.

According to an aspect of the present disclosure, a touch sensing circuit is provided comprising: a compensating module configured to provide a compensating voltage at a first node in response to control signals from a plurality of control signal lines; a read control module configured to transfer a voltage sensed by a touch sensing electrode to the first node in response to a read control signal from a read control signal line, so that the first node has a voltage which is a sum of the compensating voltage and the sensed voltage; and a driving module configured to provide an output signal associated with the sensed voltage to an output signal line in response to the voltage of the first node.

In some embodiments, the plurality of control signal lines comprise a first control signal line, a second control signal line, a third control signal line, a fourth control signal line and a fifth control signal line. The compensating module comprises a first initialization unit, a pull-down unit, a pull-up unit, a second initialization unit, a charge storage unit and a reference voltage transfer unit. The first initialization unit is configured to transfer a power supply voltage to a second node in response to a first control signal from the first control signal line and a second control signal from the second control signal line. The pull-up unit is configured to pull up the voltage of the first node to the power supply voltage in response to the second control signal from the second control signal line. The second initialization unit is coupled between the second node and third node and configured to provide, at the third node, a voltage which is a difference between the power supply voltage and the compensating voltage in response to a fourth control signal from the fourth control signal line. The pull-down unit is configured to ground the third node in response to a third control signal from the third control signal line. The charge storage unit is coupled between the third node and the first node, and configured to cause the voltage of the first node to jump from the power supply voltage to the compensating voltage in response to the third node being grounded. The reference voltage transfer unit is configured to transfer a reference voltage to the output signal line in response to a fifth control signal from the fifth control signal line.

In some embodiments, the first initialization unit comprises: a first transistor having a gate connected with the first control signal line, a source connected with the power supply voltage, and a drain connected with the second node; a second transistor having a gate connected with the second control signal line, a source connected with the power supply voltage, and a drain; and a first capacitor having a first terminal connected with the drain of the second transistor and a second terminal connected with the second node.

In some embodiments, the pull-down unit comprises a third transistor having a gate connected with the third control signal line, a source connected with the third node, and a grounded drain.

In some embodiments, the pull-up unit comprises a fourth transistor having a gate connected with the second control signal line, a source connected with the power supply voltage, and a drain connected with the first node.

In some embodiments, the second initialization unit comprises: a fifth transistor having a gate connected with the fourth control signal line, a source connected with the second node, and a drain; and a sixth transistor having a gate connected with the drain of the fifth transistor, a source connected with the second node, and a drain connected with the third node.

In some embodiments, the charge storage unit comprises a second capacitor having a first terminal connected with the third node and a second terminal connected with the first node.

In some embodiments, the reference voltage transfer unit comprises a seventh transistor having a gate connected with the fifth control signal line, a source connected with the reference voltage, and a drain connected with the output signal line.

In some embodiments, the driving module comprises an eighth transistor having a gate connected with the first node, a source connected with the power supply voltage, and a drain connected with the output signal line.

In some embodiments, the read control module comprises a ninth transistor having a gate connected with read control signal line, a source connected with the touch sensing electrode, and a drain connected with the first node.

In some embodiments, the driving module comprises an eighth transistor having a gate connected with the first node, a source connected with the power supply voltage, and a drain connected with the output signal line, and the sixth transistor and the eighth transistor have the same threshold voltage.

In some embodiments, the transistors are N type transistors.

According to another aspect of the present disclosure, a touch panel is provided comprising: a plurality of touch sensing electrodes; and a plurality of touch sensing circuits as described above. Each of the touch sensing circuits is electrically connected with a respective one of the plurality of touch sensing electrodes to output an output signal associated with the voltage sensed by the respective touch sensing electrode.

According to a further aspect of the present disclosure, a display device is provided comprising the above-mentioned touch panel.

These and other aspects of the present disclosure will be apparent from and elucidated with reference to the embodiment(s) described hereinafter.

DETAILED DESCRIPTION

Figure 1:
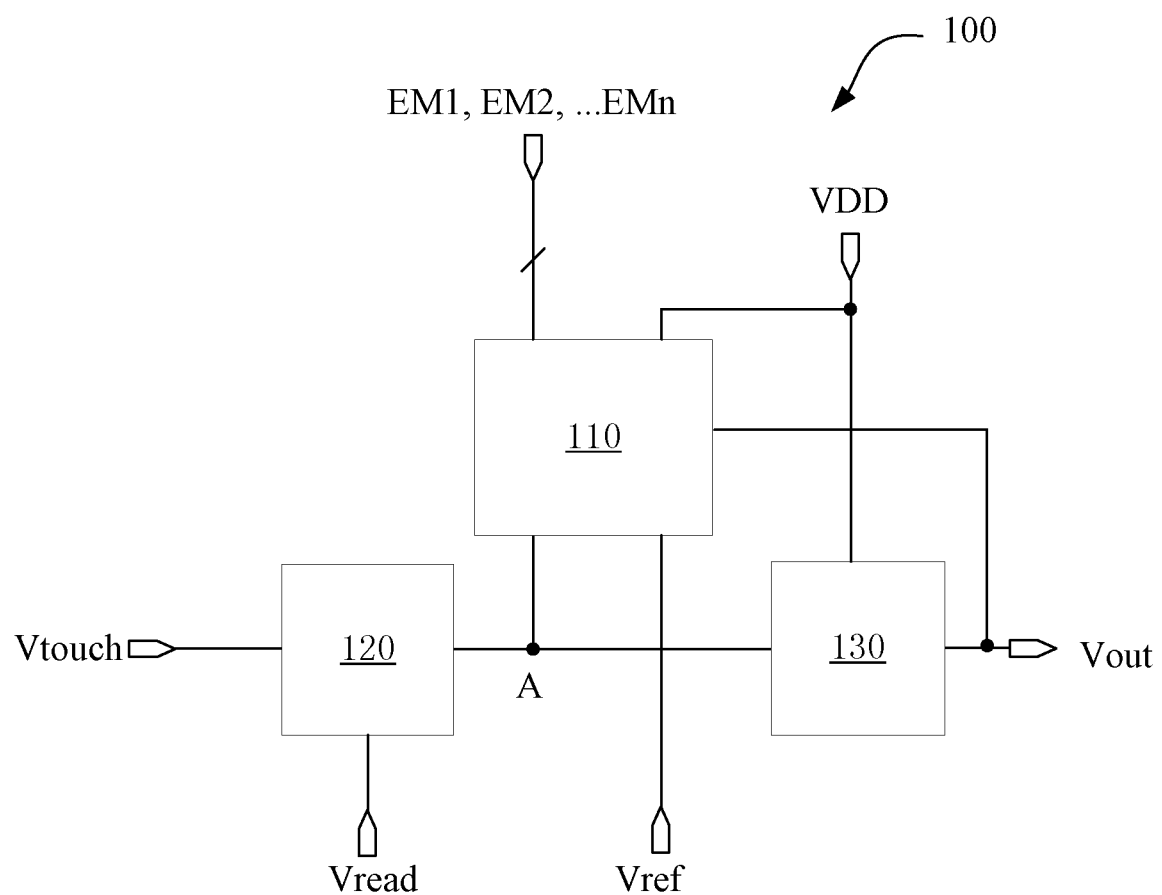
FIG. 1 illustrates a block diagram of a touch sensing circuit according to an embodiment of the present disclosure.

Embodiments of the present disclosure will be described more fully hereinafter with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Like reference numerals refer to like elements throughout.

FIG. 1 illustrates a block diagram of a touch sensing circuit 100 according to an embodiment of the present disclosure. As shown in FIG. 1, the touch sensing circuit 100 comprises a compensating module 110, a read control module 120 and a driving module 130.

The compensating module 110 is configured to provide a compensating voltage at a first node A in response to control signals from a plurality of control signal lines EM1, EM2, . . . EMn. The compensating voltage is represented by Vcomp hereinafter.

The read control module 120 is configured to transfer a voltage Vtouch sensed by a touch sensing electrode (not shown) to the first node A in response to a read control signal from a read control signal line Vread, so that the first node A has a voltage which is a sum of the compensating voltage Vcomp and the sensed voltage Vtouch.

The driving module 130 is configured to provide an output signal associated with the sensed voltage Vtouch to an output signal line Vout in response to the voltage (namely, the sum of the compensating voltage Vcomp and the sensed voltage Vtouch) of the first node A.

Figure 2:
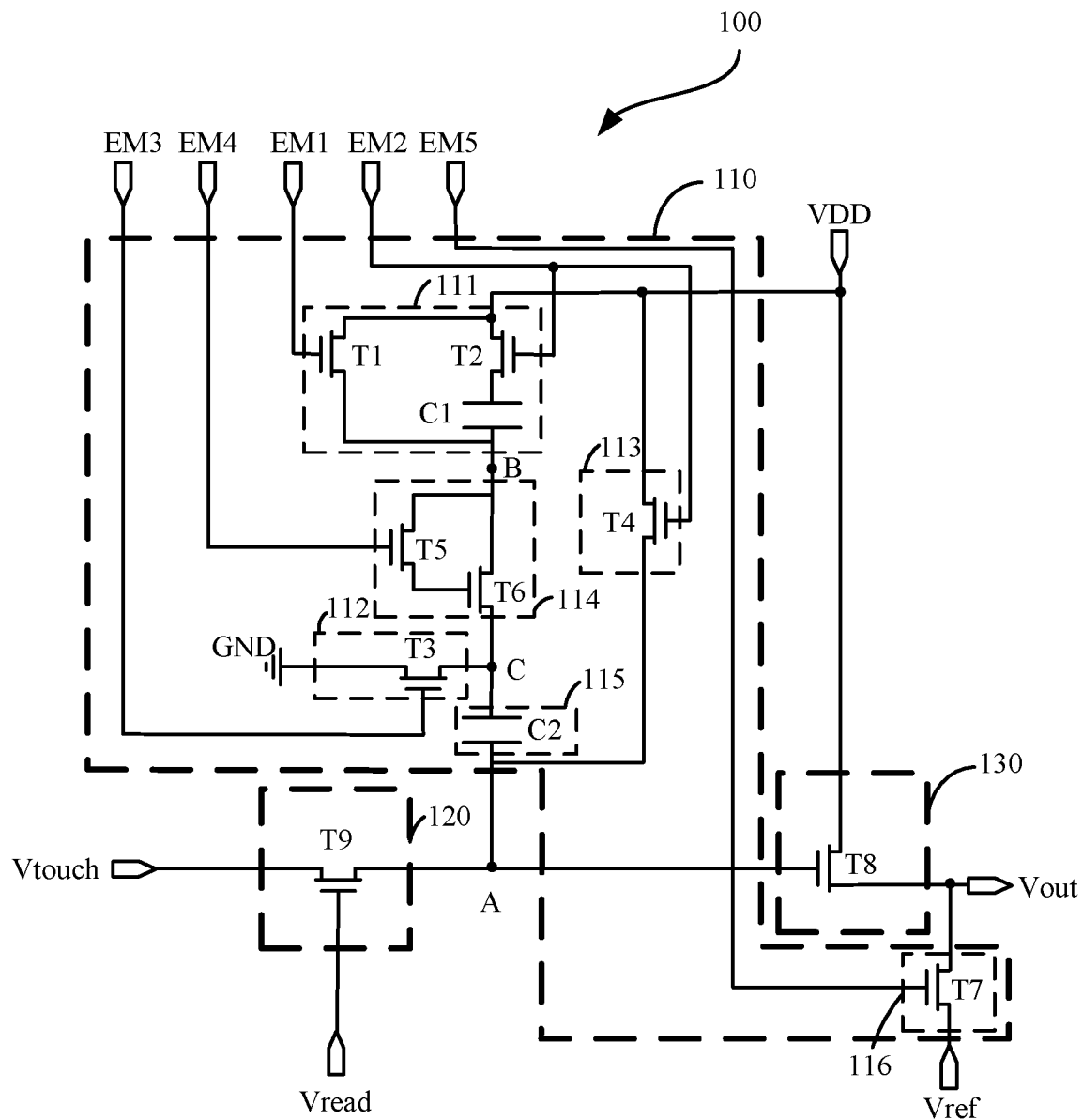
FIG. 2 illustrates a circuit schematic diagram of an implementation of the touch sensing circuit of FIG. 1.

FIG. 2 illustrates a circuit schematic diagram of an implementation of the touch sensing circuit 100 of FIG. 1. The touch sensing circuit 100 will be described in more detail in conjunction with FIG. 2.

As shown in FIG. 2, the plurality of control signal lines comprise a first control signal line EM1, a second control signal line EM2, a third control signal line EM3, a fourth control signal line EM4 and a fifth control signal line EM5. The compensating module 110 comprises a first initialization unit 111, a pull-down unit 112, a pull-up unit 113, a second initialization unit 114, a charge storage unit 115, and a reference voltage transfer unit 116.

The first initialization unit 111 is configured to transfer a power supply voltage VDD to a second node B in response to a first control signal from the first control signal line EM1 and a second control signal from the second control signal line EM2.

As shown in FIG. 2, the first initialization unit 111 comprises a first transistor T1, a second transistor T2 and a first capacitor C1. The first transistor T1 has a gate connected with the first control signal line EM1, a source connected with the power supply voltage VDD, and a drain connected with the second node B. The second transistor T2 has a gate connected with the second control signal line EM2, a source connected with the power supply voltage VDD, and a drain. The first capacitor C1 has a first terminal connected with the drain of the second transistor T2 and a second terminal connected with the second node B. In operation, the first transistor T1 and second transistor T2 operate as switch transistors. When the first transistor T1 and second transistor T2 are turned on, the power supply voltage VDD may charge the first capacitor C1 so that the voltage of the second node B is initialized to the power supply voltage VDD.

The pull-up unit 113 is configured to pull up the voltage of the first node A to the power supply voltage VDD in response to the second control signal from the second control signal line EM2.

As shown in FIG. 2, the pull-up unit 113 comprises a fourth transistor T4. The fourth transistor T4 has a gate connected with the second control signal line EM2, a source connected with the power supply voltage VDD, and a drain connected with the first node A. In operation, the fourth transistor T4 operates as a switch transistor. When the fourth transistor T4 is turned on, the voltage of the first node A is initialized to the power supply voltage VDD.

The second initialization unit 114 is coupled between the second node B and a third node C and configured to provide, at the third node C, a voltage which is a difference between the power supply voltage VDD and the compensating voltage Vcomp in response to a fourth control signal from the fourth control signal line EM4.

As shown in FIG. 2, the second initialization unit 114 comprises a fifth transistor T5 and a sixth transistor T6. The fifth transistor T5 has a gate connected with the fourth control signal line EM4, a source connected with the second node B, and a drain connected with a gate of the sixth transistor T6. The sixth transistor T6 has a gate connected with the drain of the fifth transistor T5, a source connected with the second node B, and a drain connected with the third node C. In operation, the fifth transistor T5 operates as a switch transistor, and the sixth transistor T6 operates as a diode that has a threshold voltage Vth equal to the compensating voltage Vcomp. When the fifth transistor T5 is turned on, the sixth transistor T6 operates as a turned-on diode. At this time, the voltage of the third node C is a difference between the voltage of the second node B (i.e., the power supply voltage VDD) and the threshold voltage Vth (which is equal to the compensating voltage Vcomp), namely, VDD−Vcomp.

The pull-down unit 112 is configured to ground the third node C in response to a third control signal from the third control signal line EM3.

As shown in FIG. 2, the pull-down unit 112 comprises a third transistorT3. The third transistor T3 has a gate connected with the third control signal line EM3, a source connected with the third node C, and a grounded drain. In operation, the third transistor T3 operates as a switch transistor. When the third transistor T3 is turned on, the third node C is grounded.

The charge storage unit 115 is coupled between the third node C and the first node A, and configured to cause the voltage of the first node A to jump from the power supply voltage VDD to the compensating voltage in response to the third node C being grounded.

As shown in FIG. 2, the charge storage unit 115 comprises a second capacitor C2. The second capacitor C2 has a first terminal connected with the third node C and a second terminal connected with the first node A. When the third node C is grounded and the voltage of the first node A is the power supply voltage VDD, the second capacitor C2 is charged. When the voltage of the third node C is the difference between the power supply voltage VDD and the compensating voltage, and the voltage of the first node A is the power supply voltage VDD, the voltage across the second capacitor C2 is the compensating voltage Vcomp. When the third node C is grounded again, the voltage of the first node A jumps from the power supply voltage VDD to the compensating voltage Vcomp, thereby maintaining the voltage across the second capacitor C2 at Vcomp.

The reference voltage transfer unit 116 is configured to transfer the reference voltage VDD to the output signal line Vout in response to a fifth control signal from the fifth control signal line EM5.

As shown in FIG. 2, the reference voltage transfer unit 116 comprises a seventh transistor T7. The seventh transistor T7 has a gate connected with the fifth control signal line EM5, a source connected with a reference voltage line Vref, and a drain connected with the voltage output terminal Vout. In operation, the seventh transistor T7 operates as a switch transistor. When the seventh transistor T7 is turned on, a reference voltage from the reference voltage line Vref is supplied to the output signal line Vout.

As shown in FIG. 2, the driving module 130 comprises an eighth transistor T8. The eighth transistor T8 has a gate connected with the first node A, a source connected with the power supply voltage VDD, and a drain connected with the output signal line Vout. In operation, the eighth transistor T8 operates as a driving transistor. Under control of the voltage of the first node A, the eighth transistor T8 supplies the output signal to the output signal line Vout.

As shown in FIG. 2, the read control module 120 comprises a ninth transistor T9. The ninth transistor T9 has a gate connected with a read control signal line Vread, a source connected with the touch sensing electrode, and a drain connected with the first node A. In operation, the ninth transistor T9 operates as a driving transistor. When the ninth transistor T9 is turned on, the voltage signal Vtouch from the touch sensing electrode is transferred to the first node A.

In some embodiments, all transistors in the touch sensing circuit 100 are N type transistors. As compared with embodiments where both P type transistors and N type transistors are used, employing a single type of transistors may simplify the production process and improve production efficiency. In any case, the transistors are generally fabricated such that their respective sources and drains may be used interchangeably.

In the touch sensing circuit 100 as shown in FIG. 2, the sixth transistor T6 and the eighth transistor T8 are fabricated such that the eighth transistor T8 has substantially the same threshold voltage Vth as the sixth transistor T6. As described in detail below, by virtue of the adjustment of the compensating module 110, the eighth transistor T8 that operates as a driving transistor may produce a current that is irrelevant to its threshold voltage Vth in a phase during which the sensed touch voltage Vtouch is read. As such, it is possible to alleviate or eliminate the errors in reading the sensed touch voltage Vtouch that are caused by the drift of the threshold voltage Vth of the eighth transistor T8.

Figure 3:
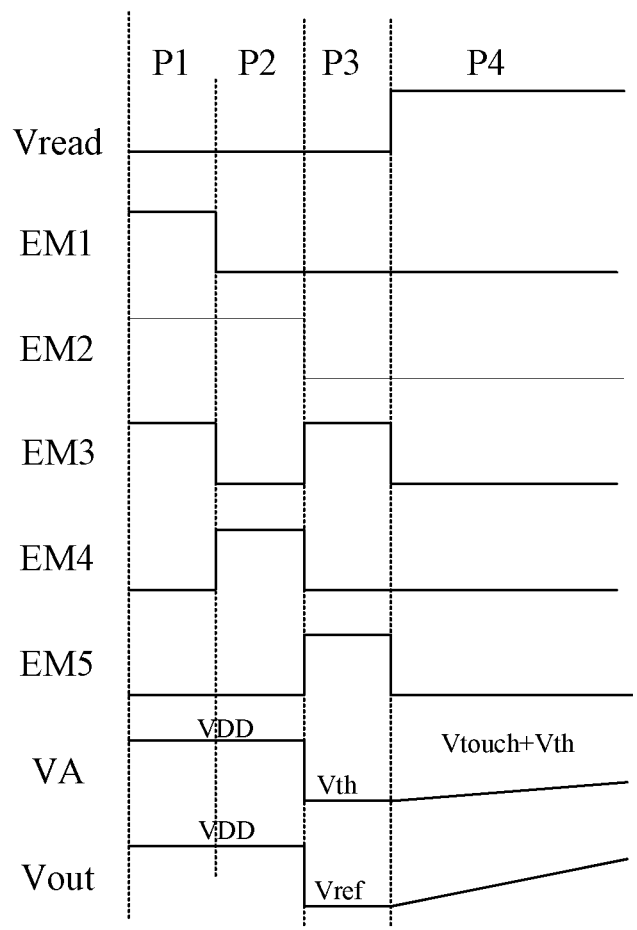
FIG. 3 illustrates a time sequence diagram of operations of the touch sensing circuit of FIG. 2.

FIG. 3 illustrates a time sequence diagram of the touch sensing circuit 100 of FIG. 2, and FIGS. 4a-4d illustrate equivalent circuit diagrams of the touch sensing circuit 100 of FIG. 2 in different phases. The operations of the touch sensing circuit 100 shown in FIG. 2 will be described in conjunction with FIGS. 3 and 4a-4d.

The procedure of the touch sensing circuit 100 reading the voltage Vtouch that is sensed by the touch sensing electrode comprises an initialization phase (P1 and P2), a compensating phase (P3) and a reading phase (P4).

Figure 4A:
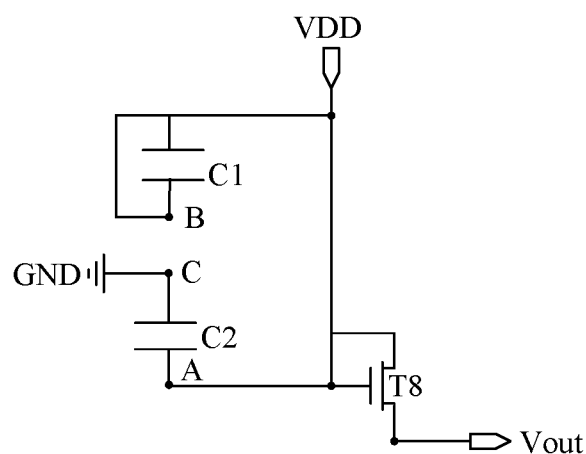
FIGS. 4a-4d illustrate equivalent circuit diagrams of the touch sensing circuit of FIG. 2 in different phases.

In a sub-phase P1 of the initialization phase, the first control signal line EM1, the third control signal line EM3 and the second control signal line EM2 are at a high level, and the read control signal line Vread, the fourth control signal line EM4 and the fifth control signal line EM5 are at a low level. At this time, the equivalent circuit diagram of the touch sensing circuit 100 is as shown in FIG. 4a. The first capacitor C1 and the second capacitor C2 are charged, the first node A is at a high level and has a voltage VA which is the power supply voltage VDD, and the second node B is at a high level and has a voltage which is the power supply voltage VDD. The third node C is grounded and hence at a low level. The eighth transistor T8 is turned on, and the power supply voltage VDD is transferred to the output signal line Vout.

Figure 4B:
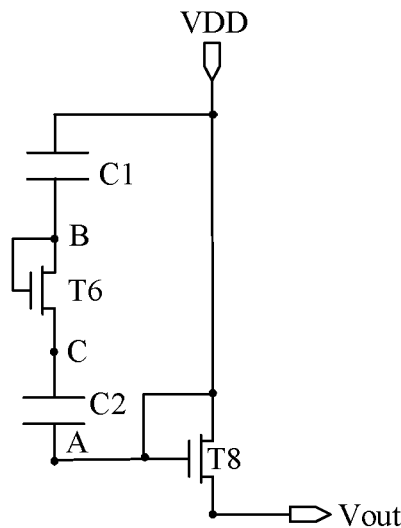

In a sub-phase P2 of the initialization phase, the second control signal line EM2 and the fourth control signal line EM4 are at a high level, and the read control signal line Vread, the first control signal line EM1, the third control signal line EM3 and the fifth control signal line EM5 are at a low level. At this time, the equivalent circuit diagram of the touch sensing circuit 100 is as shown in FIG. 4b. The second capacitor C2 discharges and the sixth transistor T6 operates as a diode so that the voltage of the third node C becomes VDD−Vth. The voltage VA of the first node A is VDD, the eighth transistor T8 is turned on, and the power supply voltage VDD is transferred to the output signal line Vout. The voltage across the second capacitor C2 is Vth.

Figure 4C:
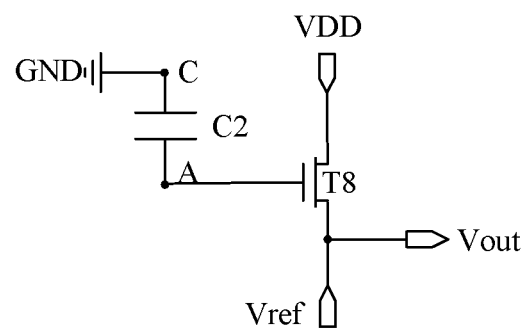

In the compensating phase P3, the read control signal line Vread, the first control signal line EM1, the second control signal line EM2 and the fourth control signal line EM4 are at a low level, and the third control signal line EM3 and the fifth control signal line EM5 are at a high level. At this time, the equivalent circuit diagram of the touch sensing circuit 100 is as shown in FIG. 4c. As the third node C is grounded, the voltage VA of the first node A jumps from VDD to Vth to maintain the voltage Vth across the second capacitor C2. The reference voltage Vref is transferred to the output signal line Vout. The reference voltage Vref is provided to keep the voltage of the output signal line Vout stable during the jumping of the voltage of the first node A.

Figure 4D:
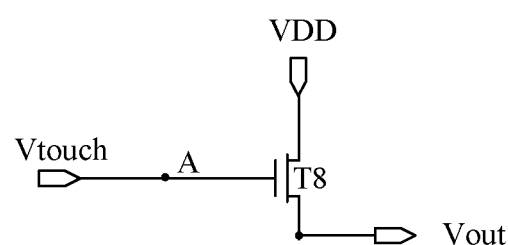

In the read phase P4, the read control signal line Vread is at a high level, and the respective control signal lines EM1, EM2, EM3, EM4 and EM5 are at a low level. At this time, the equivalent circuit diagram of the touch sensing circuit 100 is as shown in FIG. 4d. The voltage VA of the first node A is Vtouch+Vth, wherein Vtouch is the sensed voltage from the touch sensing electrode. Vtouch is shown as a slope voltage in the example of FIG. 3.

In this phase, the eighth transistor T8 operates at a saturation region and produces a saturated current. The saturated current may be calculated as follows:

$$I=K(V\text{gs}-V\text{th})^2=K(V\text{touch}+V\text{th}-VDD-V\text{th})^2=K(V\text{touch}-VDD)^2$$

where K is a constant related to a structure parameter of the eighth transistor T8, and Vgs represents a gate-source voltage of the eighth transistor T8.

It can be seen that the current I produced by the eighth transistor T8 is irrelevant to the threshold voltage Vth of the eighth transistor T8. Hence, this eliminates an influence exerted by the threshold voltage Vth of the eighth transistor T8 on the precision of the read voltage. In addition, the current I is associated with the voltage Vtouch from the touch sensing electrode, namely, I=K(Vtouch−VDD)². Hence, Vtouch may be represented by the current I.

The current I produced by the eighth transistor T8 is provided to the output signal line Vout as the output signal. It will be appreciated that the current I may be transferred by the output signal line Vout to a subsequent current-voltage converting circuit (not shown) and converted into voltage for measurement.

The touch sensing circuit 100 described in the above embodiments may be used to read the voltage sensed by the touch sensing electrode in the touch panel.

Figure 5:
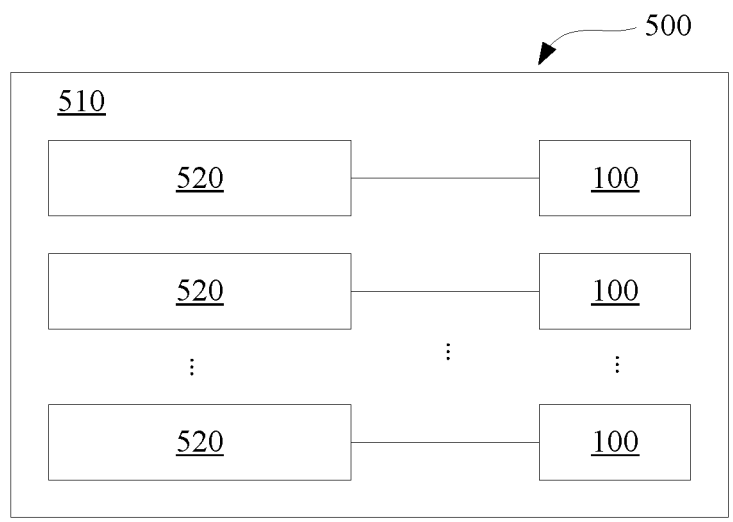
FIG. 5 illustrates a schematic view of a touch panel according to an embodiment of the present disclosure.

FIG. 5 illustrates a schematic view of a touch panel 500 according to an embodiment of the present disclosure. As shown in FIG. 5, the touch panel 500 comprises a substrate 510 and a plurality of touch sensing electrodes 520 formed on the substrate 510. The touch panel 500 further comprises a plurality of touch sensing circuits 100 as stated above. Each touch sensing circuit 100 is electrically connected with a respective one of the plurality of touch sensing electrodes 520 to output an output signal associated with the voltage sensed by the respective touch sensing electrode 520.

It will be appreciated that other aspects of the touch panel 500 may be implemented using known techniques in the art, and therefore will not be described in detail here. In some embodiments, the plurality of touch sensing circuits 100 are formed on the substrate 510. Alternatively, the plurality of touch sensing circuit 100 are formed in a chip separate from the substrate 510.

The touch panel 500 may form a component of a display device, which display device further comprises other necessary function components. An example of the display device may be a product or component that has a display function, such as a flat panel computer, a mobile phone, or a digital photo frame.

Various modifications and variations may be made to the present disclosure by those skilled in the art without departing from the spirit and scope of the present disclosure. As such, if these modifications and variations to the present disclosure fall within the scope of the appended claims and equivalents thereof, the present disclosure is also intended to include these modifications and variations.

What is claimed is:

1. A touch sensing circuit, comprising:
   a compensating circuit configured to provide a compensating voltage at a first node in response to control signals from a plurality of control signal lines;
   a read control circuit configured to transfer a voltage sensed by a touch sensing electrode to the first node in response to a read control signal from a read control signal line, so that the first node has a voltage which is a sum of the compensating voltage and the sensed voltage; and
   a driving circuit configured to provide an output signal associated with the sensed voltage to an output signal line in response to the voltage of the first node,
   wherein the plurality of control signal lines comprise a first control signal line, a second control signal line, a third control signal line, a fourth control signal line and a fifth control signal line, and
   wherein the compensating circuit comprises a first initialization circuit, a pull-down circuit, a pull-up circuit, a second initialization circuit, a charge storage circuit and a reference voltage transfer circuit, wherein
   the first initialization circuit is configured to transfer a power supply voltage to a second node in response to a first control signal from the first control signal line and a second control signal from the second control signal line;
   the pull-up circuit is configured to pull up the voltage of the first node to the power supply voltage in response to the second control signal from the second control signal line;
   the second initialization circuit is coupled between the second node and a third node and configured to provide, at the third node, a voltage which is a difference between the power supply voltage and the compensating voltage in response to a fourth control signal from the fourth control signal line;
   the pull-down circuit is configured to ground the third node in response to a third control signal from the third control signal line;
   the charge storage circuit is coupled between the third node and the first node, and configured to cause the voltage of the first node to jump from the power supply voltage to the compensating voltage in response to the third node being grounded; and
   the reference voltage transfer circuit is configured to transfer a reference voltage to the output signal line in response to a fifth control signal from the fifth control signal line.

2. The circuit according to claim 1, wherein the first initialization circuit comprises:
   a first transistor having a gate connected with the first control signal line, a source connected with the power supply voltage, and a drain connected with the second node;
   a second transistor having a gate connected with the second control signal line, a source connected with the power supply voltage, and a drain; and
   a first capacitor having a first terminal connected with the drain of the second transistor and a second terminal connected with the second node.

3. The circuit according to claim 1, wherein the pull-down circuit comprises a third transistor having a gate connected with the third control signal line, a source connected with the third node, and a grounded drain.

4. The circuit according to claim 1, wherein the pull-up circuit comprises a fourth transistor having a gate connected with the second control signal line, a source connected with the power supply voltage, and a drain connected with the first node.

5. The circuit according to claim 1, wherein the second initialization circuit comprises:
   a fifth transistor having a gate connected with the fourth control signal line, a source connected with the second node, and a drain; and
   a sixth transistor having a gate connected with the drain of the fifth transistor, a source connected with the second node, and a drain connected with the third node.

6. The circuit according to claim 1, wherein the charge storage circuit comprises a second capacitor having a first terminal connected with the third node and a second terminal connected with the first node.

7. The circuit according to claim 1, wherein the reference voltage transfer circuit comprises a seventh transistor having a gate connected with the fifth control signal line, a source connected with the reference voltage, and a drain connected with the output signal line.

8. The circuit according to claim 1, wherein the driving circuit comprises an eighth transistor having a gate connected with the first node, a source connected with the power supply voltage, and a drain connected with the output signal line.

9. The circuit according to claim 1, wherein the read control circuit comprises a ninth transistor having a gate connected with the read control signal line, a source connected with the touch sensing electrode, and a drain connected with the first node.

10. The circuit according to claim 5, wherein the driving circuit comprises an eighth transistor having a gate connected with the first node, a source connected with the power supply voltage, and a drain connected with the output signal line, and wherein the sixth transistor and the eighth transistor have a same threshold voltage.

11. The circuit according to claim 2, wherein the first and the second transistors are N type transistors.

12. The circuit according to claim 3, wherein the third transistor is an N type transistor.

13. The circuit according to claim 4, wherein the fourth transistor is an N type transistor.

14. The circuit according to claim 5, wherein the fifth and the sixth transistors are N type transistors.

15. The circuit according to claim 7, wherein the seventh transistor is an N type transistor.

16. The circuit according to claim 8, wherein the eighth transistor is an N type transistor.

17. The circuit according to claim 9, wherein the ninth transistor is an N type transistor.

18. A touch panel, comprising:
a plurality of touch sensing electrodes; and
a plurality of touch sensing circuits according to claim 1, each of the touch sensing circuits being electrically connected with a respective one of the plurality of touch sensing electrodes to output the output signal associated with the voltage sensed by the respective touch sensing electrode.

19. A display device comprising the touch panel according to claim 18.

* * * * *